June 13, 1967      R. F. SHANNON      3,325,341
METHOD OF PRODUCING STRONG FOAMED GLASS
BODIES AND STRUCTURE PRODUCED THEREBY
Original Filed June 26, 1964      2 Sheets-Sheet 1
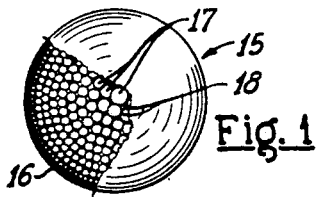
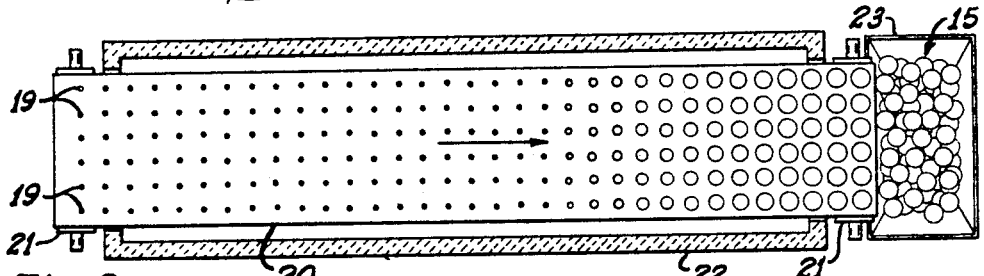
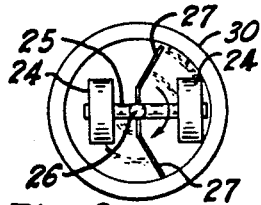
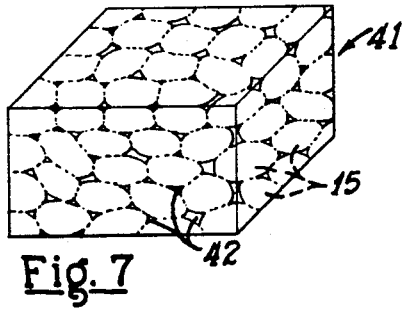
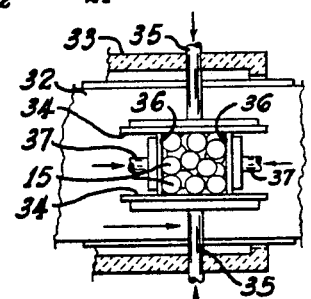
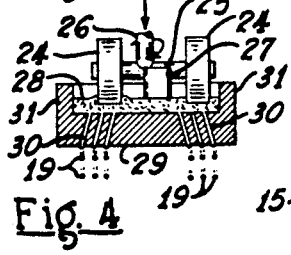
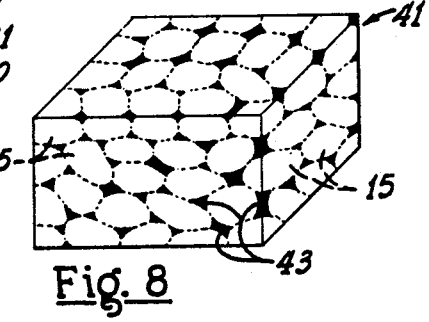
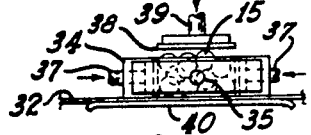
INVENTOR.
RICHARD F. SHANNON
BY
*Stachin + Auerman*
ATTORNEYS

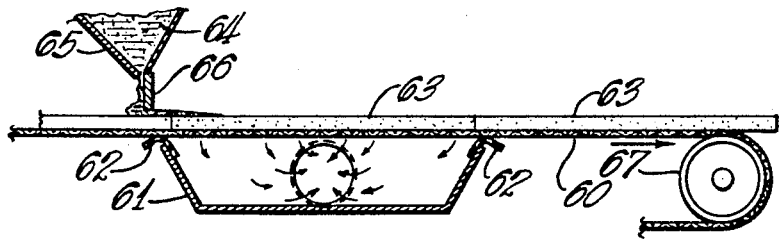
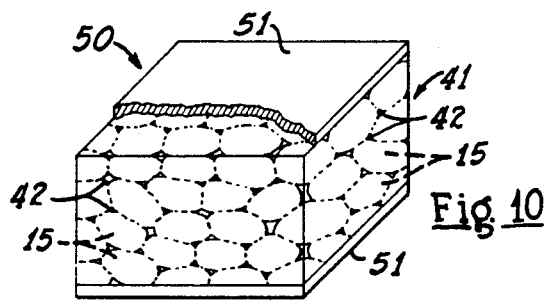
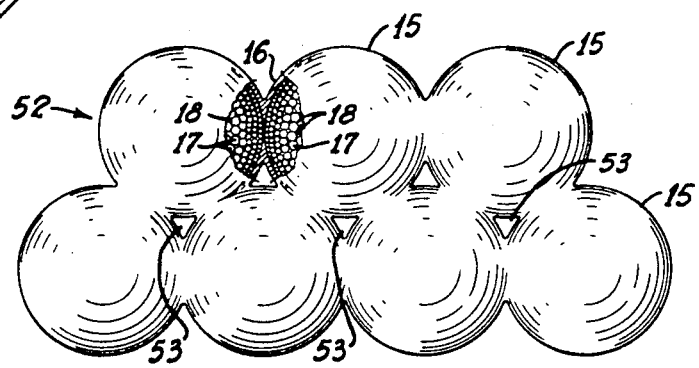
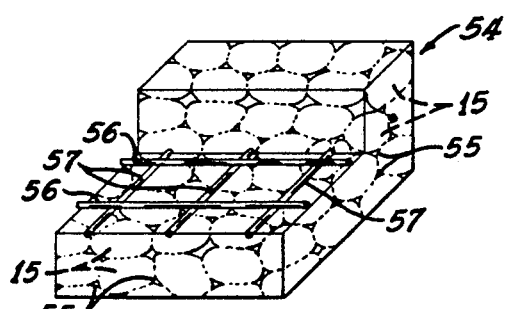

United States Patent Office 3,325,341
Patented June 13, 1967

3,325,341
METHOD OF PRODUCING STRONG FOAMED GLASS BODIES AND STRUCTURE PRODUCED THEREBY
Richard F. Shannon, Lancaster, Ohio, assignor to Owens-Corning Fiberglas Corporation, a corporation of Delaware
Original application June 26, 1964, Ser. No. 378,216. Divided and this application Aug. 29, 1966, Ser. No. 575,732
12 Claims. (Cl. 161—168)

The present application is a division of application, Ser. No. 378,216, filed June 26, 1964, which is a continuation-in-part of the then copending application, Ser. No. 132,827, filed Aug. 21, 1961, now abandoned.

This invention relates to a composite cellular article, and, more particularly, to such an article wherein numbers of cellular bodies are bonded together in fixed positions relative to one another.

Vitreous and argillaceous materials are brittle materials which break easily when subjected to thermal and/or mechanical shock. This is true whether these materials are in the form of a solid block or are in the form of a cellular product. Usually, in order that cracks do not develop in these materials when cooled from a molten state, it is necessary to stress relieve them. Even when they are stress relieved, however, they break or shatter when struck.

Vitreous and argillaceous cellular materials have never met with appreciable commercial success because they the extremely brittle and fragile, and because they crush and are broken easily by the forces envolved in the normal handling of the materials. For example, blocks of glass foam when dropped onto a concrete floor will break into many pieces.

An object of the present invention is the provision of a new and improved method of making strong and non-fragile structures from light weight vitreous or argillaceous foam material.

Another object of the invention is the provision of a new and improved durable and non-fragile insulation material containing cellular glass.

Another object of the invention is the provision of a new and improved insulation material of the above described type which has an extremely low coefficient of heat transfer and which coefficient does not increase numerically with age.

Other object and advantages will be apparent from the description which follows, reference being made to the accompanying drawings, in which:

FIG. 1 is an idealized plan view of a glass foam pellet having a substantially continuous, impervious exterior region, with a portion of the pellet broken away to show details of the structure;

FIG. 2 is a plan view, with parts broken away to show details of construction, of a furnace in which the pellets of FIG. 1 can be produced;

FIG. 3 is a plan view of a muller which can be used to produce pellets which constitute a charging material for the furnace of FIG. 2;

FIG. 4 is a vertical sectional view of the muller of FIG. 3;

FIG. 5 is a fragmentary view in horizontal section showing continuous apparatus for the production of a structure which constitutes a plurality of cellular bodies each of which is enclosed within a substantially continuous, impervious skin that is continuous from cellular mass to cellular mass in some portions of the structure, and discontinuous in others;

FIG. 6 is a partially schematic vertical sectional view of the apparatus of FIG. 5;

FIG. 7 is a perspective view of an article which can be produced with the apparatus of FIGS. 5 and 6;

FIG. 8 is a view in perspective of the article of FIG. 7 with interstices thereof filled with a suitable binder composition;

FIG. 9 is a fragmentary view in elevation showing apparatus for producing the impregnated material of FIG. 8;

FIG. 10 is a perspective view of an article similar to that of FIG. 7, but with upper and lower skin materials added thereto;

FIG. 11 is an idealized view in vertical elevation, with portions broken away to show details of the structure, of a fragment of the article of FIG. 7; and FIG. 12 is a perspective view, with parts broken away to show details of construction, of a novel combination of a structure similar to that of FIG. 7 and a reinforcing material.

The instant invention is based upon the discovery that cellular pellets made of a fusible glass, argillaceous, or ceramic material having continuous, substantially impervious non-cellular exterior skins, can be fused together by heat and pressure to provide a unitary structure having connecting interstitial voids throughout. The interconnected voids between the substantially non-cellular skins can advantageously be filled or impregnated in whole or in part, by either organic or inorganic binders. Bodies of pellets fused and impregnated as above described have properties that are entirely unexpected and are amazingly different from the properties of both the cellular material from which the pellets are made and of the material used to impregnate the interstitial voids of the body of fused pellets.

Referring now in more detail to the drawings and, in particular to FIG. 1, a pellet which is particularly useful in producing articles according to the invention is designated generally at 15. The pellet 15 comprises a substantially continuous, impervious skin 16 and a plurality of cells 17, each of which is defined by a thin wall 18 of the same material as the skin 16.

The pellet 15 can conveniently be produced by depositing foamable bodies 19 on a conveyor belt 20 carried by rolls 21, one of which is driven in any suitable manner (not illustrated) to advance the belt 20 in the direction indicated by the arrow in FIG. 2. The foamable bodies 19 are advanced by the belt 20 into a furnace enclosed by walls 22, and heated in any suitable manner (not illustrated) to cause drying of the foamable bodies 19, followed by cellulation, and the formation of the substantially continuous, noncellular skin. The pellets 15 are then discharged from the righthand end of the belt 20 into a hopper 23.

It will be noted in FIG. 1 that the cells 17 in the interior of the pellet 15 are shown as larger in size than those adjacent the skin 16. This is caused by the disruption of the cells in the exterior portion of the pellet while the sidewalls of the cells are still molten to produce the pellet 15 as described above. It will be appreciated that such heating must be to a temperature sufficiently high to cause at least incipient fusion of the surface portion, so that reforming of burst cell walls into a substantially noncellular skin is produced. It will also be noted that the pellet 15 is represented as being regular in configuration, and spherical in overall shape. This is not necessarily the situation, and, in fact, would seldom occur in actual practice, since the heating to cause foaming of the bodies 19 in the furnace of FIG. 2, for example, is not to a temperature sufficiently high for surface tension to cause contraction to the minimum volume spherical shape, and, additionally, because the bodies are not free floating during this heating. In fact, it is often desirable to deform the pellets to provide particular required shapes. The walls 18 are also represented as being continuous. This is highly advantages in some situations, e.g., when the pellets are to be used in making thermal insulating structures. However, broken walls 18 are advantageous in other situations, e.g., when the pellets are to be used in acoustical insulating structures. Both types of pellets can be provided, and are contemplated hereby.

The foamable bodies 19 can conveniently be prepared in apparatus which is shown in FIGS. 3 and 4, and which comprises two wheel members 24, each of which is journaled to a shaft 25, which is carried by a drive shaft 26 mounted in any suitable manner (not illustrated) for rotation in the direction indicated by the arrows in FIGS. 3 and 4. A scraper blade 27 is welded or otherwise rigidly attached to the shaft 25 for rotation therewith. A foamable composition 28 is carried by a plate member 29 through which orifices 30 are provided, and which has integral, upwardly extending side walls 31 to confine the foamable material 28 laterally. As the drive shaft 26 is rotated, it is also urged downwardly in the direction of the arrow in FIG. 4 so that it causes working of the foamable composition on the plate member 29 and through the orifices 30 so that foamable bodies 19 are extruded from the orifices 30. Other types of available pelletizing apparatus can also be used to produce the bodies 19.

The foamable composition 28 in the apparatus of FIGS. 3 and 4 can conveniently consist of 100 parts[1] of a glass A,[2] 0.5 part of aluminum flake, 1.5 parts of anhydrous calcium sulfate and 1.5 parts of barium sulfate. All of the constituents of the foamable composition are in a powdered form, all finer than about 50 mesh, U.S. Sieve Series, and substantially all being finer than 200 mesh, the aluminum flake being minus 325 mesh in its entirety. It will be noted that this composition is principally glass. This is an important consideration, because the glass is of uniform, consistent quality, so that the bodies 15 (FIG. 1) which are produced therefrom are also of uniform, consistent quality. It has been found that cellular glass pellets are unexpectedly effective, by comparison with previously known pellets, at improving the thermal insulating properties of binders with which they are used. The fineness of the cells of the glass foam pellets is an important factor in achieving the improved properties. It will be appreciated that the calcium sulfate and the barium sulfate are used merely as blowing agents, and are useful because they release gases at a temperature range in which the particular glass identified above has viscosity characteristics suitable for cellulation or foaming. The aluminum flake apparently acts as a nucleating agent. Very fine powders of other materials which do not melt at the softening temperature of the glass, can also be used as nucleating agents. Suitable examples are −325 mesh powders of titanium dioxide, zircon and chromium oxide. The fine particles of non-melting material act as seeds about which the blowing gases accumulate to produce an extremely large number of small gas bubbles. It will also be appreciated that various other glasses could be used in place of Glass A, and with the same blowing agents if those glasses have the same high temperature viscosity characteristics as Glass A, or with a different blowing agent or blowing agent composition if, as is more likely to be the situation, the high temperature viscosity characteristics are significantly different. In this instance, as is true in the formulation presented above, the blowing agent or blowing agent composition would be required to be one which released gases over a temperature range at which the glass had the required viscosity characteristics. For example, foams have been produced from finely ground soda lime glass and 1/10 percent of 100 mesh silicon carbide plus 3/4 percent of sodium carbonate, and it is believed that increasing the percentages of both the silicon carbide and the sodium carbonate by as much as 50 percent would improve the properties of the pellets. Pellets 15 can be produced from the foamable composition identified above, in the apparatus of FIG. 2, by controlling the heating of the furnace defined by the walls 22 and the drive rate of the belt 20 so that the foamable bodies 19 are heated to about 1900° F. during passage through the furnace. The glass pellets which are produced using a sulfate salt as a blowing agent are filled with sulfur dioxide gas which is objectionable in some instances. The odor of the pellets can be reduced by treating the pellets with a resin containing activated carbon. In some instances the sulfur dioxide gas in the pellets may cause a corrosion problem and this can be greatly reduced by coating the pellets with paraffin wax. It has also been found that the pellets can be made stronger and less pervious to water by coating with a resin containing a silicone. With some compositions of glass, it is possible to use powdered zinc or metallic mercury as a blowing agent. The glasses which are used with these metallic blowing agents must have softening points below the vaporization point of the metal. Mixtures of the powdered glass and metal are heated together to cause a softening of the glass; a subsequent increase in temperature then causes the metals to vaporize to cause a foaming of the glass.

In some instances, it may be desirable to improve the heat resistance of the foamed glass pellets that are produced by any of the above-suggested methods. This can be done by reheating the glass foam pellets to cause a partial recrystallization, or devitrification. The devitrification process can be aided by adding at least one metal oxide, such as $TiO_2$, directly to the mixture used to produce the cellular pellets. The metal oxides can also be applied by spraying the pellets with a water solution of the metal oxides and then refiring. In some instances, it may be desirable to produce glass pellets having a surface that is high in silica. This can be accomplished by treating the pellets made from a leachable glass with hydrochloric acid to leach out the non-silica components of the glass.

Continuous apparatus fragmentarily represented in FIGS. 5 and 6 can be used to produce an unexpectedly advantageous body from a plurality of the cellular pellets 15. The apparatus of FIGS. 5 and 6 comprises a continuous belt conveyor 32 which is suitably mounted in any suitable manner (not illustrated) for movement in the direction of the arrow of FIG. 5 through a furnace defined by walls 33. Heat is supplied to the furnace in any suitable manner (not illustrated) to bring the cellular pellets 15 to a temperature sufficiently high that at least incipient fusion occurs on the surfaces thereof. In the case of the cellular pellets 15 produced from the previously identified foamable composition, sufficient fusion occurs at 1900° F., and it has been found that heating a mass of such pellets about one inch thick, and in a graphite mold, from room temperature to about 1900° F. in a period of about ten minutes provides a satisfactory degree of fusion. When the pellets have been heated to provide the requisite fusion at the surfaces thereof, two vertically extending side platens 34 carried by rods 35 are urged together from withdrawn positions adjacent the edges of the belt 32, in the directions of the arrows shown in FIG. 5, to the positions shown, in loose contact with vertically extending end platens 36, carried by rods 37. At the time that the side platens 34 are advanced to the

---

[1] The terms "percent" and "parts" are used herein and in the appended claims to refer to percent and parts by weight, unless otherwise indicated.
[2] Glass A has substantially the following chemical analysis, in percent:

$SiO_2$ ---- 54.6
$Al_2O_3$ ---- 14.3
CaO ---- 17.4
MgO ---- 4.8
$B_2O_3$ ---- 7.5 and less than ½ percent of each of the following:
F₂
$R_2O$ ($Na_2O$, $K_2O$)
$Fe_2O$
$TiO_2$
ZnO position shown in FIG. 5, the end platens 36 are in withdrawn positions just within the outer extremities of the platens 34, from which they are then advanced in the directions of the arrows of FIGS. 5 and 6 to the positions shown in FIG. 5. These movements of the platens 34 and 36 cause a piling up of the cellular pellets 15 within the space partially enclosed by these platens in the positions shown in FIG. 5. An upper platen 38 carried by a shaft 39 is then moved downwardly in the direction of the arrow shown in FIG. 6 to compress the pellets, while their surfaces are in a state of at least incipient fusion, within the space enclosed by the platens 34, 36, and 38, and the belt 32. It will be noted that a support 40 is provided immediately below the belt 23 in the region where this compression occurs. It is necessary to maintain the pressure on the pellets 15 only until cooling of the pellets below their flow temperature; then the platen 38 can be moved upwardly and the platens 34 and 36 withdrawn away from the body of pellets which has been produced. Movement of the belt 32 discharges this body from the furnace.

Referring now to FIG. 7, a body of pellets which can be produced in the manner just described in connection with FIGS. 5 and 6 hereof is designated generally at 41. The body 41 comprises a plurality of the pellets 15, distorted somewhat from the shape in which they were originally produced, but still clearly recognizable. However, by virtue of the hot pressing operation just described, the substantially continuous, impervious skins of the several pellets are fused together at points of contact. Interstices 42, which would ordinarily be filled with air and which may comprise from 5 to 75% by volume of the block, remain in the article 41 in regions where the skins of adjacent pellets were not in contact during the operations described in conjunction wtih FIGS. 5 and 6. When produced from the pellets 15, the block 41 is a glass foam having substantially the properties of a thermal insulating material and from the strength standpoint, has the properties of a block of the same size but which is substantially completely cellular in nature and devoid of the impervious skins and the intersitices 42. It has a low K. value, or is an excellent thermal insulating material, not only because it is fine-celled in nature, but also because $SO_2$ from the decomposition of the barium sulfate and calcium sulfate is trapped therein. It has been found that partial devitrification of the glass sometimes occurs, so that the pellets 15 in the article 41, and even as produced in the apparatus of FIG. 2, may be as much as about 25 percent crystalline.

A massive body of a foam similar to that of the article 41 can be produced, so far as is known, only by extremely tedious and laborious procedures. For example, if a large mass of the previously identified foamable composition were charged into the furnace of FIG. 2 of the instant application and heated in the manner described, only a substantially worthless glass foam would be discharged from the surface. It has been found that stresses which result from such a heating cycle causes a massive body of the indicated composition to be so fragile that it is substantially worthless. Because the foam has a low K. value, large thicknesses of the cellular material requires such an extended annealing operation that the thick sections are too expensive for commercitally usage. Under most circumstances, it is at least difficult to produce foams of low apparent density in this way. The conventional and commercial method for producing glass foams involves the solution of glass in a glass melt, the casting and rapid cooling of relatively small bodies of such melt with dissolved gases therein, a slow, carefully controlled reheating to above the softening temperature for rejection from solution of the dissolved gases to cause foaming, and, finally, a carefully controlled annealing. So far as is known, both the controlled reheating to cause foaming and the annealing are practiced commercially as batch operations because of the difficulty of achieving adequate control in a continuous process. It will be appreciated, therefore, that the production of a massive body of a glass foam by the method discussed above in connection with FIGS. 5 and 6 constitutes a significant advance in the art.

It has also been found that the massive foam body 41 can be produced in a manner different from that discussed above. For example, the previously identified foamable composition can merely be introduced into a graphite mold, fired to about 1950° F. for about 12 minutes and then cooled in ambient air. A mold 12 inches by 18 inches by ½ inch thick with lips at its edges has been used satisfactorily with a layer of the foamable composition about 3/16 inch thick. After firing as indicated, a massive product ranging from about ½ inch to about 3 inches in thickness has been produced. The resulting product is extremely fragile, and ordinarily will crack spontaneously during cooling, even if it is not handled. This massive, fragile foam body is then broken up and particles of a desired size range which result are selected, and can be used in lieu of the pellets 15 in carrying out the processing steps discussed above in conjunction with FIGS. 5 and 6. The heating cycle to which reference is made in such discussion will cause sufficient fusion of the glass foam fragments to provide a substantially continuous, impervious skin, and also to enable adhesion of the individual fragments into a unitary structure. Such structure will have a somewhat higher density than that described above, will have a slightly less regular cell structure, and will be slightly less effective as a thermal insulating material, but will be otherwise substantially identical.

The massive glass foam body 41 of FIG. 7 is also unexpectedly advantageous because of the interstices 42 therein. This foam can be impregnated with any desired and suitable cementitious composition having a modulus of elasticity and other physical properties different from that of the glass to modify the properties thereof in any of many desired ways, and throughout extensive limits. For example, the massive foam body 41 can be impregnated with asphalt to produce the modified structure shown in FIG. 8 wherein masses 43 of asphalt fill the interstices 42 of the FIG. 7 structure. Although asphalt is a soft-pliable material, the foamed body 41 that is impregnated with asphalt is amazingly strong and the impregnated foamed body can be dropped repeatedly on concrete without breaking. Under the same conditions a foamed body 41 that is not impregnated breaks into many pieces. It is believed that the unexpected strength occurs through a phenomenon whereby the asphalt absorbs shock waves to prevent force concentration at points removed from the point of impact. When the impregnated material is dropped upon concrete, the damage is limited to crushing in the region of impact, and because the glass has high compressive strength, the amount of crushing that occurs is negligible. The impregnating material should coat pellets adjacent the area of fusion in a manner bridging the pellets since this is the area where shock waves and other forces concentrate. Asphalt impregnation, therefore, strengthens the impregnated foamed body, not by reason of the strength which the asphalt imparts, but because of a unique cooperation wherein a second material having a radically different modulus of elasticity changes the apparent modulus of the resulting foamed glass body. Because the resulting body no longer has a high and uniform modulus, it is "detuned" relative to shock waves, so that they no longer produce a stress concentration.

By way of another specific example, a structure similar to that shown in FIG. 7 was prepared by pouring 100 grams of foam glass pellets 15 having a true density (the density of just the pellets themselves and not including the voids therebetween) of 8.0 pounds per cubic foot into a 6″ x 6″ x 2½″ graphite mold. A 1½″ thick piece of graphite was placed on top of the pellets, the mold was heated to 1950° F. for a sufficient period of time to soften but not melt the pellets, and the graphite lid was then pressed into the cavity to form a block of fused pellets 6″ x 6″ x 2″ thick. The mold was then allowed to cool and the resulting block had an apparent density (density of the block including the voids) of 5.3 pounds per cubic foot. This produced a structure generally similar to that shown in FIG. 7. Thereafter the sample was dipped into molten asphalt to allow the asphalt to penetrate the voids, following which the sample was removed and excess molten asphalt allowed to drain therefrom. The asphalt on the surface of the block cooled off before all of the excess could drain from the block, and this excess was thereafter removed by placing the block in an oven heated to a temperature from 25–50° F. above the softening point of the asphalt to allow the excess to drain off of the surface of the block. The resulting asphalt impregnated block similar to that shown in FIG. 8 had a density of 14.8 pounds per cubic foot. Depending upon the amount and density of pellets that are placed into the mold, blocks of fused pellets having an apparent density of 4–12 pounds per cubic foot have been asphalt impregnated to produce blocks having an apparent density ranging from 7–20 pounds per cubic foot. It has been found that the composition of the asphalt which is used is not particularly critical, but those having low viscosities, low tackiness, and softening points can be used at lower temperatures and will penetrate faster than those which are tacky and have high viscosities. The amazing properties produced by impregnation of the foamed glass body with a bituminous material such as tar, pitch, asphalt, etc. can be produced by still other materials. Waxes, such as paraffin wax, and especially high melting waxes can be used.

The interstices can be filled, instead of with asphalt, by a suitable foamed or cellular synthetic resinous material. The foamed material can be a phenolic foam, which can be of the resole type suggested in U.S. Patent No. 2,979,469, of the novolac type, for example as suggested in U.S. Patent No. 2,993,871, or of the ureaformaldehyde-, polyurethane-, polystyrene-, epoxy-, or polyester- type.

By way of example, 28 grams of a foamable novolac resin of the type described in Patent No. 2,993,871 was placed in the bottom of a 6″ x 6″ square metal mold and a 6″ x 6″ x 2″ high block of fused pellets made in the manner above described, was placed on top of the foamable phenolic powder. A lid with a few breather holes was placed on top of the mold and the mold was placed in a press preheated to 330°–360° F. for ten minutes. As in the previous embodiment, the glass pellets from which the 6″ x 6″ x 2″ block was made had a true density of 8 pounds per cubic foot such that the block had an apparent density of 5.3 pounds per cubic foot with a void area of approximately 33.75%. The heating in the mold caused the foamable resin to expand up through the voids of the board to give a final product weighing 125 grams and an apparent density of 6.6 pounds per cubic foot.

By way of another example, a 6″ x 6″ x 2″ glass foam pellet composite block made in the same manner above described from pellets having a true density of 8 pounds per cubic foot, and a block apparent density of 5.3 pounds per cubic foot was dipped into an alcohol solution of a phenolic foamable resin mixture, the composition of which was as follows: 77 parts of a novolac resin of the type disclosed in Patent No. 2,993,871, 16 parts hexamethylene tetramine, two parts Unical ND, two parts X-520 silicone, and 40 parts methyl alcohol. 40–42 grams of the solution remained in the voids of the block when removed from the solution, and the block was thereafter dried to remove excess alcohol to leave the resin solids dispersed throughout the voids of the block. Thereafter the block was placed in a dielectric press having platens heated to a temperature of between approximately 330°–350° F. for approximately ten minutes to foam the resin and completely fill the voids. The final apparent density of the block was 6.6 pounds per cubic foot. It will be apparent that a phenolic foam has a modulus of elasticity very much different from that of the glass, and that an impregnating material which does not transmit shock waves readily, prevents the propogation of the shock waves through the foamed glass.

The interstices can also be filled by a foamed asphalt, or by a substantially non-cellular synthetic resinous material or composition of either the thermoplastic or the thermosetting type. When the interstices or voids are filled with organic binder compositions, particularly in a foamed condition, the excellent acoustical and thermal insulating properties of the glass foam can be significantly augmented.

Another excellent material is provided by impregnating the body 41 of fused foam glass pellets with molten sulfur. Not only does the sulfur operate in a manner anologous to the asphalt wherein it provides a composite of two dissimilar materials having different physical properties to damp out shock waves, but it causes a modification of the crystalline growth of the sulfur upon cooling which causes the sulfur to add great strength. The molten sulfur flows into narrow interstices, the closely adjacent surfaces of which prevent crystals of sulfur from growing. It is a property of sulfur that it has great strength if its crystalline growth is inhibited, so that it is either in an amorphous state, or has very fine crystals. It will also be apparent that regions of maximum stress concentration occur at the ends of the narrow interstices where the sulfur solidified from a molten state has its greatest strength.

Similarly, the strength of a body of fused foamed glass pellets is increased when their interstrices are impregnated with molten salts which normally form large crystals upon cooling unless confined between closely adjacent surfaces. Salts which are normally not used for producing strong materials because of their large crystalline structures, will add considerably greater strength to a body of fused glass pellets than these salts would have either by themselves or when used as a cementitious matrix. A strength out of proportion to that attributed to the weighed average of the normal strength of a salt is had when any molten salt is used to impregnate the body of foamed glass pellets. The crystallizable salts should preferably have a melting point between 250–1500° F., should not sublime, and not be hydroscopic. To illustrate, lead chloride ($PbCl_2$) is not thought as a cementitious material, but when melted and flowed into the interstices in a body of fused pellets, greatly increases the strength thereof. By way of example, a 6″ x 6″ x 2″ block of the fused pellet material shown in FIG. 7, having an apparent density of 5.3 pounds per cubic foot, and made from pellets having a true density of 8 pounds per cubic foot, was dipped into molten lead chloride having a temperature of between 975–1050° F. The excess lead chloride was allowed to drain out, and the sample was then heated in an oven having a temperature of approximately 1050° F. until all of the excess salt drained from the block. In some instances it will be helpful to suck heated air at a temperature of above 1000° F. through the block to remove excess lead chloride. The block of fused cellular pellets when impregnated had a density of 18 pounds per cubic foot, and could be dropped upon the floor repeatedly without breaking.

Similarly molten silver chloride greatly increases the strength of a body of fused foam glass pellets.

A 6″ x 6″ x 2″ block of fused cellular pellets of the type shown in FIG. 7 having a density of 5.3 pounds per cubic foot and made from pellets having a density of 8 pounds per cubic foot was dipped into molten silver chloride having a temperature of from 900–950° F. The excess silver chloride was allowed to drain therefrom, and the impregnated block was placed in an oven having a temperature of 1000° F. The impregnated block had a density of 18 pounds per cubic foot and could be dropped repeatedly upon the floor without breaking.

Similarly, salts deposited in the interstices of a body of foam glass pellets from solution will greatly increase the strength of the impregnated body where the adjacent surfaces of the pellets forming the opposite side of the interstices are closely adjacent. They limit the size of the crystals that are produced upon the removal of the solvent, as for example, water to provide a considerably stronger cementitious material than would normally be expected. This controlled crystalline growth also occurs on the surface of pellets surrounding large voids, provided the thickness of the film of solution is relatively thin. The crystalline growth is thereby limited to the distance between the surface of the film and the surface of the glass. The distorted crystals formed thereby will nevertheless be joined to adjacent crystals to form a continuous cementitious layer which coats the surfaces of the pellets surrounding the voids. A greatly improved product or composite is thereby produced. A particularly useful product is produced by impregnating the voids with an aqueous slurry of materials forming calcium silicates. The calcium silicates do not crystallize into good light weight insulating material, but the crystalline growth thereof is inhibited in the manner above described. Normally calcium silicates, while a good insulating material, do not have appreciable strength because of the properties of its crystalline structure. This material, however, when crystallized in the interstices of the body of fused glass pellets does have appreciable strength which augments that of the fused pellets. By way of example:

880 grams of quick lime, 700 grams of diatomaceous earth, 400 grams of silica, 100 grams of clay (all powders of approximately 325 mesh) were mixed with 12,500 grams of water. A 6″ x 6″ x 2″ block of fused pellets of the type shown in FIG. 7 was impregnated with this slurry by placing the slurry on top of the block while subjecting the bottom of the block to suction from a rubber hose. The pellets used in making the block had a true density of 8 pounds per cubic foot, and the block before impregnation had an apparent density of 5.3 pounds per cubic foot (40% voids). The impregnated block was then placed in a steam cabinet having a temperature of from 190–205° F. for one hour to preharden the slurry. The block was then placed in an autoclave to convert the slurry to tobermorite. The pressure in the autoclave was raised from atmospheric pressure to 250 p.s.i. in one-half hour with the injection of live steam. Thereafter the temperature was raised to 550° F., and a circulating fan started to effect drying of the product. After two hours of this drying operation the super heat was turned off and the pressure in the autoclave slowly reduced to atmospheric pressure over a period of one-half hour. The finish block had a density of approximately 9.7 pounds per cubic foot.

Similarly, the interstices can be filled with any of various inorganic materials such as sillimanite, calcium aluminate, hydraulic cements, e.g., Portland cement, gypsum, or Keene cement, an oxy-sulfate cement, an oxy-phosphate cement, an oxy-chloride cement, bentonite, clay, a silica sol, a colloidal alumina such as that available under the name "Baymal," sodium borosilicate (a boric acid-sodium silicate reaction product), mono-aluminum phosphate, or the like. A particularly good material is made by mixing from 1/10 to 3 parts by weight if solids of a silical sol per part of an acid phosphate salt of the type disclosed in U.S. Patent 2,479,504. When the interstices are filled with any one of the indicated inorganic cementitious materials, the excellent strength properties of the foam body 41 can be significantly improved. A substantially completely fireproof material resistant to elevated temperatures for extended periods of time can be provided where the impregnant has insulation properties. Such material can have the strength properties requisite for use as a wall board, or even as a complete partition, and even for structures where it is required to constitute a load bearing portion thereof.

In addition to the methods described above causing the impregnates to coat the surfaces of the pellet surrounding the interstitial voids, it will be advantageous in many instances to use a vacuum to suck the impregnants through the voids. A form of apparatus for using vacuum to help produce flow through the voids is shown in FIG. 9. In the apparatus shown in FIG. 9, an endless belt 60 of wire mesh passes over a vacuum pan 61. The vaccum pan 61 has flexible seals 62 which engage the bottom surface of the wire mesh to effect a seal therewith. Blocks 63 of fused foamed glass pellets rest upon the top surface of the endless screen 60 so that they pass over the face of the vacuum pan 61. Prior to passing over the vacuum pan 61, an impregnant 64 is applied to the top surface of the block 63 from a hopper 65 having a doctor blade 66, the bottom surface of which is spaced above the top surface of the block 63 by a distance corresponding to the desired thickness of material that is desired to be pulled into the voids of the block 63. The endless belt 60, of course, passes over a head pulley 67 and returns around a tail pulley, not shown. While any organic or inorganic molten material or solution can be applied by the apparatus shown in FIG. 9, it can also be used for pulling foamed materials down into the voids of the blocks of fused foamed glass pellets. A particularly good process is provided when the foamable solution of a phenol formaldehyde resin as previously referred to is applied to the top surface of the blocks 63, and is sucked through the block by vacuum.

By way of example, a slurry of gypsum is mechanically whipped into a froth, preferably using a small amount of surface active agent, and the froth is fed to the hopper 65. The foam is thereafter spread upon the top surface of the slab 63 and suction in the pan 61 produces a differential pressure across the slab 63 which forces the foam to flow through the voids. In most instances it will be desirable to completely fill the voids of the slab 63 with the foam, by using a slight excess of the impregnant, so that some of the impregnant remains on the top surface when the foam begins to exude from the bottom surface of the slab. If the voids of the slab are not to be filled, a smaller amount of the impregnant is applied to the top surface of the slab than is required to fill the voids. After all of the material which has been applied to the top surface of the slab has been pulled beneath the top surface of the slab, air flow through the voids of the slab is produced which then distributes the impregnant throughout the full thickness of the slab. This air flow, of course, has the greatest velocity through the center of the interstitial voids, leaving the impregnant upon the surface of the pellets surrounding the voids. After the conveyor has moved the slab past the vacuum box 61, and the impregnation step is completed, these slabs are removed from the conveyor, and allowed to either cool, dry, hydrate, and/or cure as the case may be.

The massive glass foam body 41 of FIG. 7, with the interstices 42, or with asphalt, gypsum or the like, filling the interstices as shown in FIG. 8, can advantageously be provided with upper and lower stress-spreading skins. Such a structure, designated generally at 50, is shown in FIG. 10. The specific structure 50 comprises the foamed glass insulating mass 41 of FIG. 8 with asphalt filling the interstices 42 between adjacent ones of the pellets 15. In addition, gypsum skins 51 have been provided on the upper and lower major surfaces thereof. These skins can be provided merely by troweling or otherwise applying layers of gypsum onto these surfaces, as indicated, or they can be separately produced and then applied to a liquid asphaltum or other adhesive layer which has been spread on the upper and lower major surfaces. It can also be advantageous merely to glue paper skins on the major surfaces of the structure with or without the gypsum or other skins, the gypsum or other skins, the asphaltum or other adhesive, or both, can also advantageously be reinforced with fibers of glass or other vitreous material, metal, sisal, excelsior or the like.

An idealized fragment of a structure according to the invention which can be produced by the processing steps discussed above in conjunction with FIGS. 5 and 6 is indicated generally at 52 in FIG. 11. This idealized fragment comprises a plurality of the pellets 15, each with a substantially continuous, impervious skin 16 and cells 17 defined by walls 18. The pellets 15 are represented as being substantially identical in size, and spherical, as well as uniformly spaced in the structure. They are also shown as being separated by voids 53 which are extremely small by comparison with the voids 42 of the FIG. 7 structure. It will be appreciated that the magnitude of the voids, or of the total void area in such a structure, can be varied within relatively broad limits by varying the force with which the platens 34, 36 and 38 compact the heated pellets (FIGS. 5 and 6). The idealized fragment 52 of FIG. 11 illustrates the effect of a relatively large force to cause such compaction, although it will be appreciated that, in such instance, the pellets 15 would be significantly distorted, even if they had originally been spherical, and substantially identical in shape. It has been found in actual practice that the pellets 15, disregarding the skins 16, have an apparent density as low as about 4 pounds per cubic foot when produced from the composition specifically discussed above, and that the pellets themselves, with the skin 16, have an apparent density as low as about 5 pounds per cubic foot. Using these pellets it has been found to be possible to produce articles of the type of that shown in FIG. 11 having an overall apparent density as high as about 80 pounds per cubic foot, and as low as about 4 pounds per cubic foot merely by varying the compressive force applied as discussed.

It has also been found that it is possible to achieve unique cooperation between a reinforcing material and a body comprising a plurality of the pellets 15 or the like fused together at points of contact and with interstices between adjacent ones of such pellets in certain areas. Such a combination is designated generally at 54 in FIG. 12. The combination structure 54 comprises a plurality of the pellets 15 which are fused to one another at points of contact to provide a unitary structure with interstices 55 present therein. In addition, the structure includes reinforcing rods 56 and reinforcing rods 57 which extend at right angles to the rods 56. Such a structure can be produced by the processing steps discussed above in conjunction with FIGS. 5 and 6 by providing, in addition, the rods 56 supported in appropriate openings provided in the platens 34 and, also, the rods 57 supported in appropriate openings provided in the platens 36. Some of the pellets 15 are than introduced into the resulting mold cavity below the rods 56 and 57, while others are introduced thereabove, and the heating and compression steps are carried out as discussed. It has been found that the reinforcing members should be within the body for a novel cooperation to be achieved, and preferably from about ¼" to about ½" above a bottom surface thereof. The presence of the reinforcing members is particularly significant when a structure according to the invention, in service is to span a considerable distance between supports, and may be required to resist considerable loads applied to a minor dimension thereof, for example, as in a roof deck material. Although it has been found that such structures, even without the reinforcing material, have considerable strength when used in such a manner, the provision of a reinforcing material as described disproportionately increases their strengths. While the members 56 and 57 have been referred to as reinforcing rods, it should be noted that their diameters in the actual structure represented are not greater than about ⅛", and that ordinary chicken wire has been found to be excellent for this purpose. In some cases, it may be desirable to provide reinforcing rods as large as ½" in diameter. It will be appreciated that the interstices 55 of the combination structure 54 could, if desired, be filled with any of the binders or binder compositions which have been discussed above.

An acoustical tile composite can be made by adhering a slab of the glass foam body shown in FIG. 7 to the surface of a phenol formaldehyde bonded glass fiber board. The glass foam body can be bonded to the glass fiber board with any suitable adhesive, as for example, a gypsum cement. Likewise, a fire-rated acoustical tile can be made by adhering a slab of glass foam held together by a phenol formaldehyde binder to the surface of a phenol formaldehyde bonded glass fiber board. It has further been found that the pellets 15, when used as an aggregate or filler for poured gypsum decks will greatly reduce the weight of the deck or slab without materially reducing the strength of the deck.

It will be apparent that various changes and modifications can be made from the specific details set forth herein and shown in the attached drawings without departing from the spirit and scope of the invention as defined in the appended claims.

I claim:

1. A method of producing strong light weight foamed glass bodies comprising: forming foamed glass pellets each having a fused generally impervious outer skin of glass integral with foamed cellular glass filling and reinforcing the outer skin, fusing the outer skins of a plurality of said pellets together to form a body and leave interconnected interstitial voids communicating with the exterior surface of said body, and impregnating said interstitial voids with a cementitious material in a manner coating the surface of the pellets surrounding the voids.

2. The method of claim 1 wherein the impregnation step is carried out in a manner which coats the surfaces of the pellets surrounding the interstitial voids but does not fill the interstitial voids with said cementitious material.

3. The method of claim 1 wherein said impregnation step is carried out using a molten material, and said molten material is cooled in situ on said pellet surfaces surrounding said interstitial voids.

4. The method of claim 3 wherein the molten material is a bituminous material.

5. The method of claim 3 wherein the molten material is sulphur.

6. The method of claim 1 wherein a foam of an organic foamable resin is applied to the top surface of the body of fused pellets, and vacuum is applied to the bottom surface to pull said foam through said interstitial voids.

7. The method of claim 1 wherein a solution of a foamable phenolformaldehyde resin is applied to the top surface of the body of fused pellets, suction is applied to the bottom surface to pull said solution through said interstitial voids, and the resin is foamed in situ.

8. A method of producing light weight foamed glass insulating material comprising: preparing an admixture of a sulfate containing salt and a fusible glass forming material, simultaneously fusing said glass forming material and decomposing the sulfate to sulfur dioxide to produce a foamed glass, the cells of which are filled with sulfur dioxide, causing the foamed glass to rigidify in the form of pellets having generally impervious outer skins filled and braced with foamed glass, fusing a body of the pellets together to interconnect the pellets at spaced parts leaving interconnected interstitial voids which communicate with an exterior surface of the body, and closing off said voids with a material which seals in the sulfur dioxide.

9. A structure comprising a plurality of generally spherical cellular bodies each of which includes a substantially continuous, impervious outer skin and a cellular interior within said skin, and composed of a fusible vitreous glass material that forms a network of closed cells within said skin, the skin of each body being in contact with and fused to the skin of adjacent bodies, said structure having a plurality of innerconnected interstitial voids between portions of at least some of the outer skin of said adjacent bodies which interstitial voids communicate with an exterior surface of the bodies, and a hardened cementitious material coating the surface of pellets surrounding said interstitial voids.

10. A structure as claimed in claim 9 wherein the cementitious material is gypsum.

11. A structure as is claimed in claim 9 wherein the cementitious material is a cellular organic resin.

12. A structure as claimed in claim 9 wherein the cementitious material is sulfur deposited in situ from a molten condition.

References Cited

UNITED STATES PATENTS

| | | | |
|---|---|---|---|
| 2,481,391 | 9/1949 | Campbell | 106—75 X |
| 2,691,248 | 10/1954 | Ford | 65—18 |
| 2,797,201 | 6/1957 | Veach et al. | |
| 2,806,509 | 9/1957 | Bozzacco | 106—40 X |

S. LEON BASHORE, *Acting Primary Examiner.*

R. L. LINDSAY, *Assistant Examiner.*